(12) United States Patent
Frisina

(10) Patent No.: US 6,385,621 B1
(45) Date of Patent: May 7, 2002

(54) COMPUTER SOFTWARE FOR MAINTENANCE RESOURCE MANAGEMENT

(76) Inventor: Franklin Peter Frisina, 5 Rochelle Dr., New City, NY (US) 10956

( * ) Notice: Subject to any disclaimer, the term of this patent is extended or adjusted under 35 U.S.C. 154(b) by 0 days.

(21) Appl. No.: 09/443,649

(22) Filed: Nov. 19, 1999

Related U.S. Application Data

(60) Provisional application No. 60/109,270, filed on Nov. 20, 1998.

(51) Int. Cl.[7] .............................. G06F 17/00; G06F 7/00
(52) U.S. Cl. ......................... 707/104.1; 707/1; 707/10; 707/104.1; 705/7; 705/11
(58) Field of Search .................. 707/1–10, 500–542, 707/104.1; 705/7–11

(56) References Cited

U.S. PATENT DOCUMENTS

| | | | | |
|---|---|---|---|---|
| 4,763,356 A | * | 8/1988 | Day, Jr. et al. | 379/368 |
| 5,233,513 A | * | 8/1993 | Doyle | 354/401 |
| 5,291,394 A | * | 3/1994 | Chapman | 364/401 |
| 5,640,577 A | * | 6/1997 | Scharmer | 395/768 |
| 5,752,054 A | * | 5/1998 | Garber et al. | 395/767 |
| 6,148,297 A | * | 11/2000 | Swor et al. | 707/3 |
| 6,178,418 B1 | * | 1/2001 | Singer | 707/3 |

* cited by examiner

*Primary Examiner*—Paul R. Lintz
*Assistant Examiner*—Linh M Pham
(74) *Attorney, Agent, or Firm*—William J. Sapone; Nims Howes Collison Hansen & Atkins LLP

(57) ABSTRACT

The invention is an integration software program that enables a user to use the logic and data accessible in a job standards development program to develop a job plan which is then transferred to a job planning software program where it is finalized and used to produce work orders. Integrating these two programs results in producing job plans rapidly and assures optimum utilization of labor, materials and tools.

14 Claims, 10 Drawing Sheets

FIG. 2

```
┌─────────────────────────────────────┐
│ ▭    Job Preparation        ▽  △   │
│  ┌───────────────────────────────┐  │
│  │          Hours                │  │
│  │                ───            │  │
│  │   Shop         0.1            │  │
│  │   Site         0.1            │  │
│  │   Safety       0.1            │  │
│  │   Daily        0.5            │  │
│  └───────────────────────────────┘  │
└─────────────────────────────────────┘
```

F I G. 3

```
┌─────────────────────────────────────────┐
│ ▭         Top 1 Crafts          ▽  △   │
│  ┌───────────────────────────────────┐  │
│  │         Lead    1      2      3   │  │
│  │ CRAFT   MECHJP  MECHJPWD          │  │
│  │ Size    2       1      0      0   │  │
│  │ Hours   2.76    1.13   0.00   0.00│  │
│  │                                   │  │
│  └───────────────────────────────────┘  │
└─────────────────────────────────────────┘
```

F I G. 4

```
┌─────────────────────────────────────────┐
│ ▭         Session Window          ▽    │
│  ┌───────────────────────────────────┐  │
│  │  Does this JOB PLAN need a        │  │
│  │        SITE INSPECTION ?          │  │
│  └───────────────────────────────────┘  │
│  Choose from the list                   │
│  ┌───────────────────────────────────┐  │
│  │ yes                               │  │
│  │ no                                │  │
│  └───────────────────────────────────┘  │
│                                         │
│              ┌──────┐                   │
│              │ ✓ OK │                   │
│              └──────┘                   │
└─────────────────────────────────────────┘
```

Session Window

What is the NOUN for the equipment being worked on ?

Choose from the list

```
ANNUNCIATOR
BEARING
BOARD
BREAKER
COOLER
DOOR
EXCITER
GATE
GOVERNOR
HEAD COVER
HOIST
HOUSING
LOG
MULTIPLE
N/A
NONE
PACKING
PENSTOCK
PROBE
PUMP
```

✓ OK

F I G. 7

Session Window

What is the FIRST QUALIFIER ?

Choose from the list

```
WICKET
NONE
```

✓ OK

F I G. 8

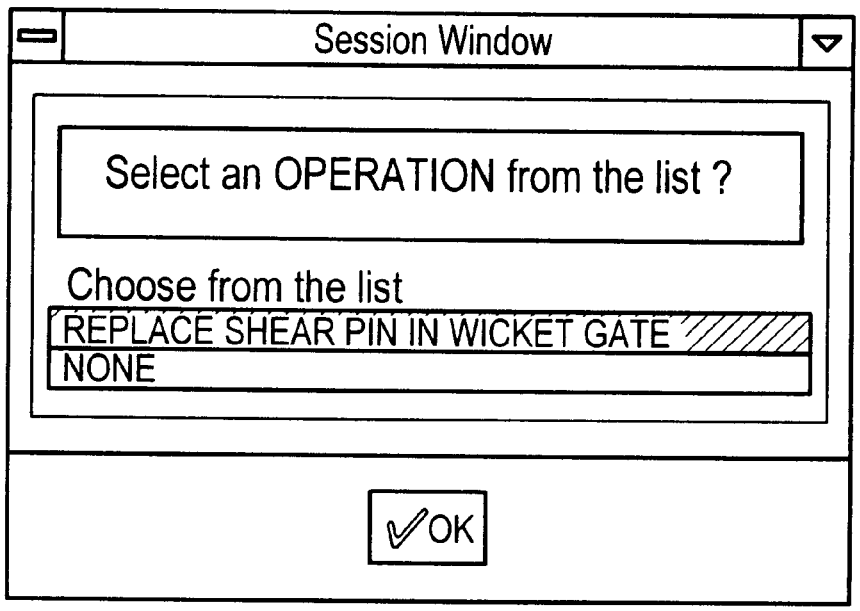
F I G. 11
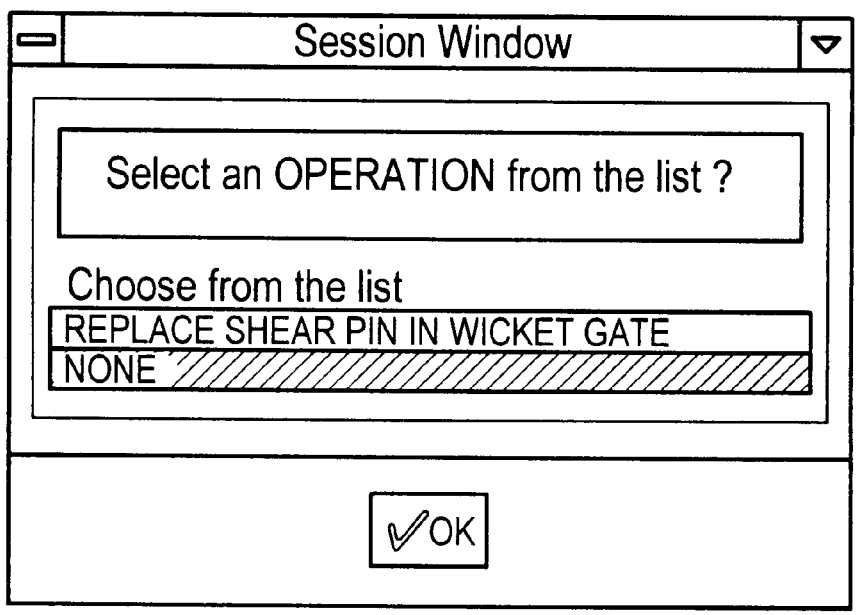
F I G. 12

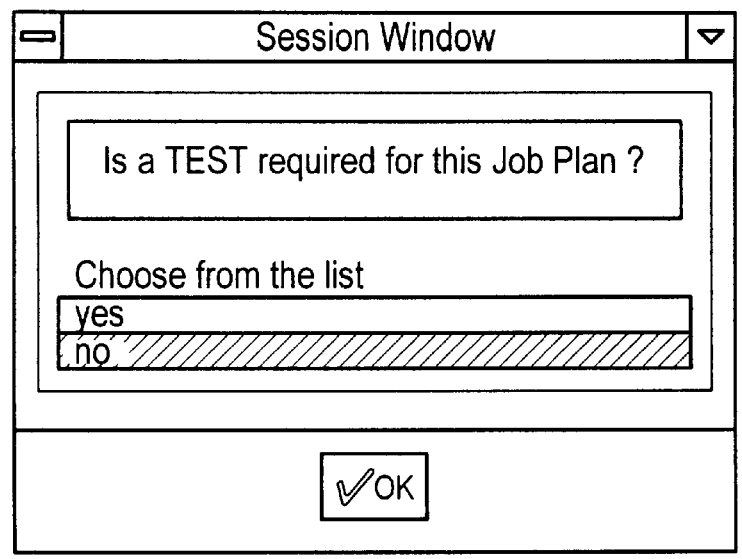
F I G. 17
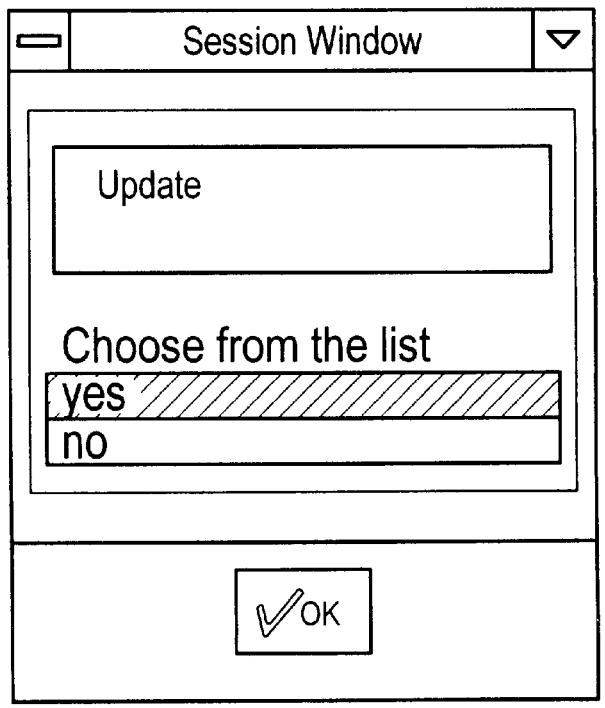
F I G. 18

COMPUTER SOFTWARE FOR MAINTENANCE RESOURCE MANAGEMENT

This application claims benefit of Provisional application No. 60/109,270 filed Nov. 20, 1998.

TECHNICAL FIELD

This invention relates to computer software for managing maintenance work in an industrial facility and more particularly to integrating two software systems to optimize resource management.

BACKGROUND

It is important, particularly in large scale industrial facilities, to properly and timely coordinate workers, equipment and materials to complete repairs and to complete preventive maintenance programs. Discrepancies in the allocation of these resources can result in significant equipment downtime and increased labor costs.

Software is available which is useful for establishing job plans and work plans. One such job planning software package is known as MAXIMO®, a program developed and available from PSDI, Inc. This program assists a user in developing the actual work orders which will be issued to a crew.

Another software program available which is useful in resource planning is a job standards program used to create, maintain and manipulate standards for maintenance work, that is detailing the steps to be taken and manhours/trades needed to complete a task, allowing a user to construct new standards using information retained in a database. For example AutoMOST™, available from H.B. Maynard and Company, Inc. performs this function.

These software programs are distinct. Information used in or generated by one program is not available for use in the other program. Thus, a user typically enters information into the job planning program to prepare work orders, without access to and comparison with the job standards program.

SUMMARY OF THE INVENTION

It is an object of the present invention to provide an integration program which integrates a job planning program with a standards development program to allow a user to use such standards to build a complete job plan.

It is another object to provide an integration program which enables a user to toggle between a job planning program and a standards development program to enable the user to generate an optimum work plan.

It is yet another object to reduce data entry by allowing data entered in one program to be integrated into the databases accessible by each program.

It is yet another object to optimize resource allocation by producing job plans which integrate standards based on a logic tree coordinated with data accumulated over time, and to provide a means for updating standards based on actual time, manpower, tools and materials used to complete a task.

These and other objects of the present invention are achieved by a computer integration system for maintenance resource management comprising:

a computer;

a first software program for producing job standards based on predetermined user queries and information contained in a first database, the first software program being accessible by the computer;

a second software program for producing a job plan and work orders based on information supplied by the user, the second software program being accessible by the computer; and an integration software program accessible by the computer, the integration software program having a switch responsive to a user command initiated from either the first or second software program to switch the user to the second or first software program respectively, and having means for supplying data from one software program to the other software program for filling predefined fields such that the user can generate a job standard in the first software program and transfer the developed job standard into a job plan saved in the second software program.

The inventive integration software package preferably utilizes the MAXIMO job planning program as the second software program, providing instructions for accessing preferably the AutoMOST program, which acts as the first software program, allowing a user to develop the specific job operation steps using the job standards program and transferring this as a complete job plan or as information for loading into the appropriate fields in the MAXIMO program. The MAXIMO program then saves the job plan or completes the job plan for use in generating work orders.

Utilizing the present invention, a user can use historical data and multi-activity analysis to identify the steps needed to complete a new job plan or use existing operation/suboperation job standards and integrate that data directly into the job plan. This substantially reduces the time needed to estimate the time, tools, material and labor needed to complete a job and optimizes resource utilization by developing a job plan based on job standards. Further, utilizing the capabilities of the job standards program increases the ability to accurately plan for manhour allocation, and material utilization, avoiding errors or omissions that can result in a poor plan that disrupts the overall manpower resource allocation.

BRIEF DESCRIPTION OF THE DRAWINGS

FIG. 2 is an illustration of a job planning display;

FIG. 3 is an illustration of a job preparation time display;

FIG. 4 is an illustration of a crew type and size determination display;

FIG. 5 is an illustration of a completed job plan; and

FIGS. 6–18 illustrate exemplary queries from a job standards program.

DETAILED DESCRIPTION OF THE INVENTION

Figure 1:
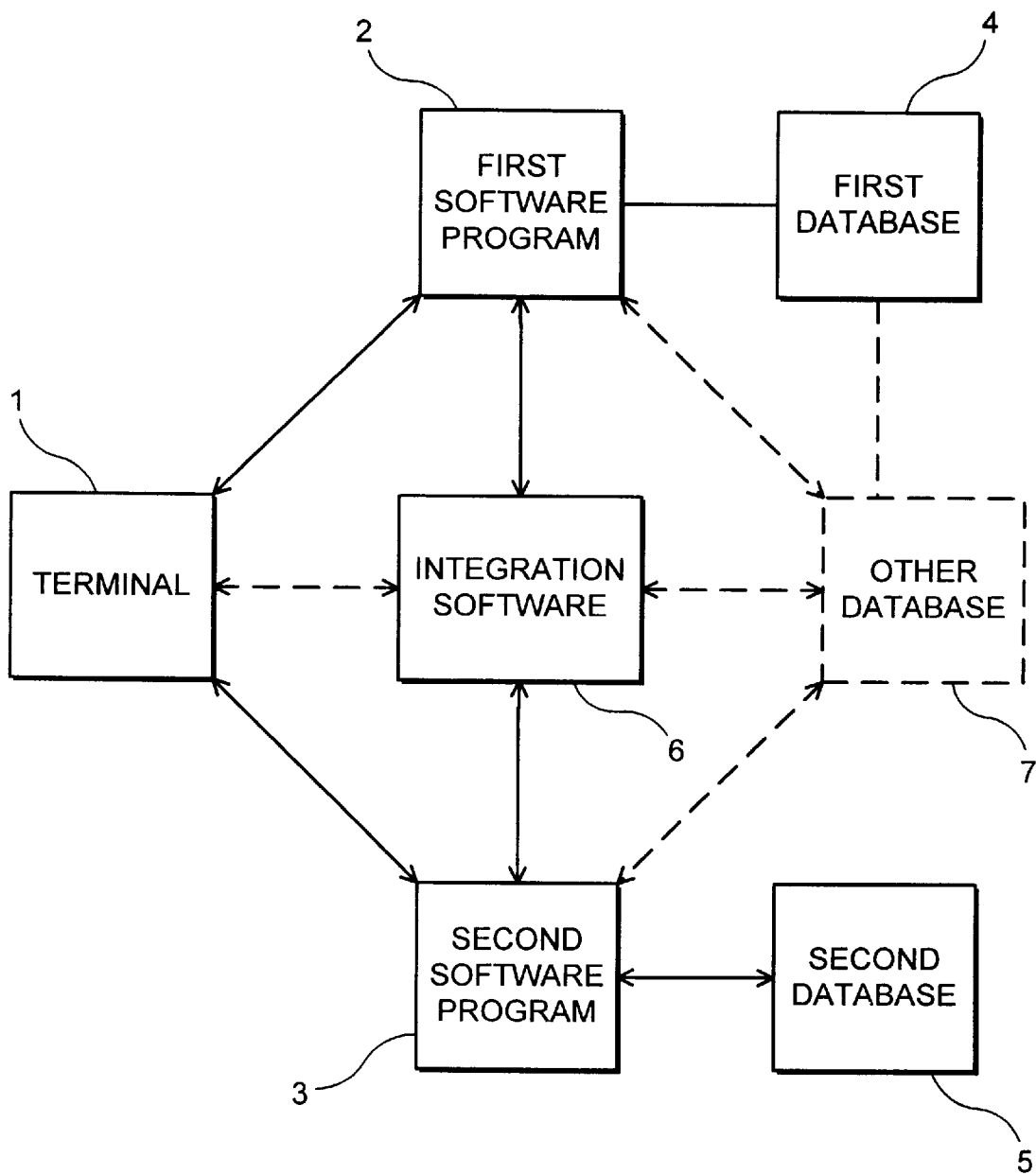
FIG. 1 is a block diagram of the system according to the present invention.
Figure 10:
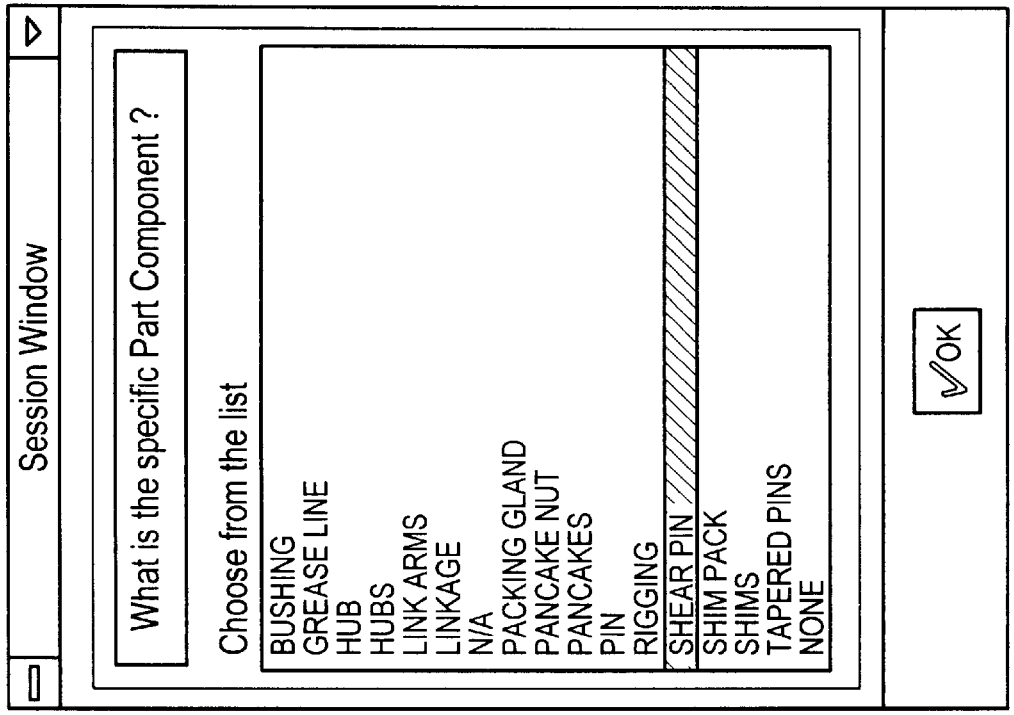
Figure 9:
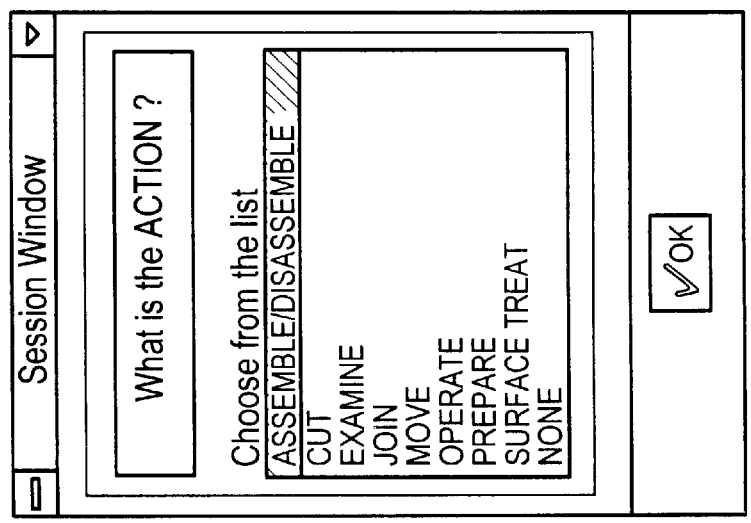
Figure 13:
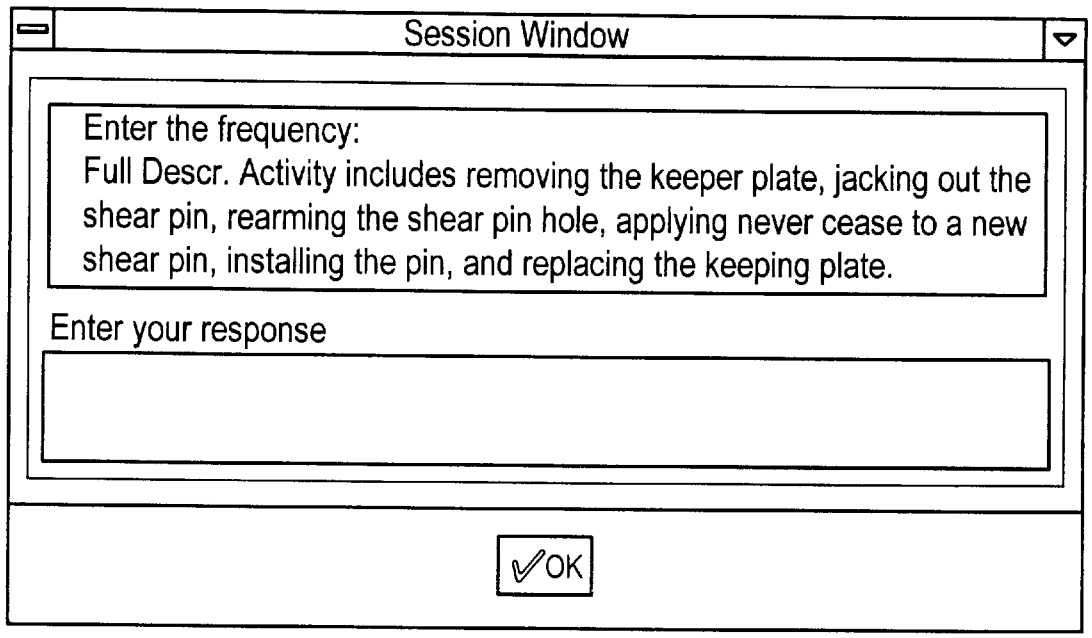
Figure 14:
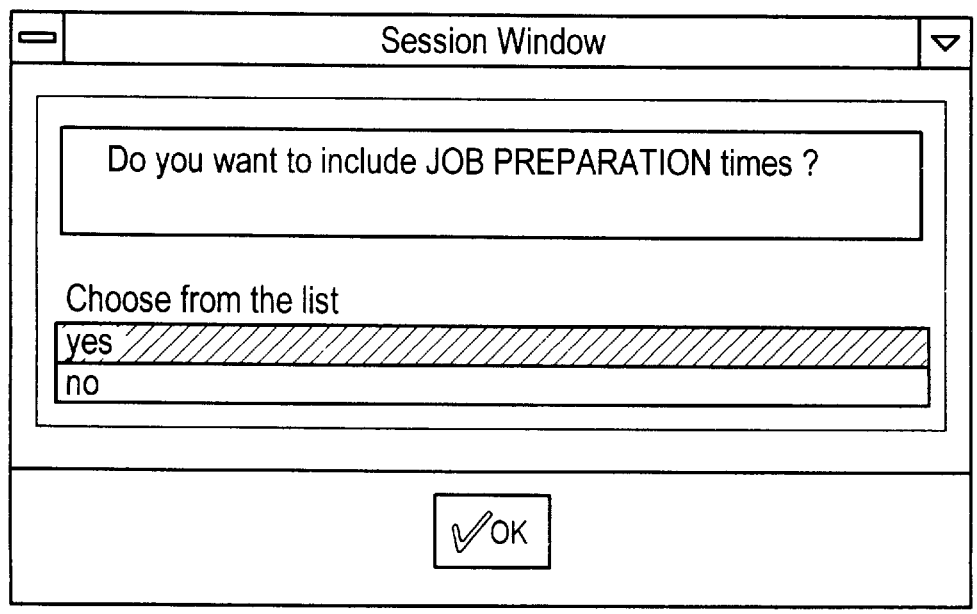
Figure 15:
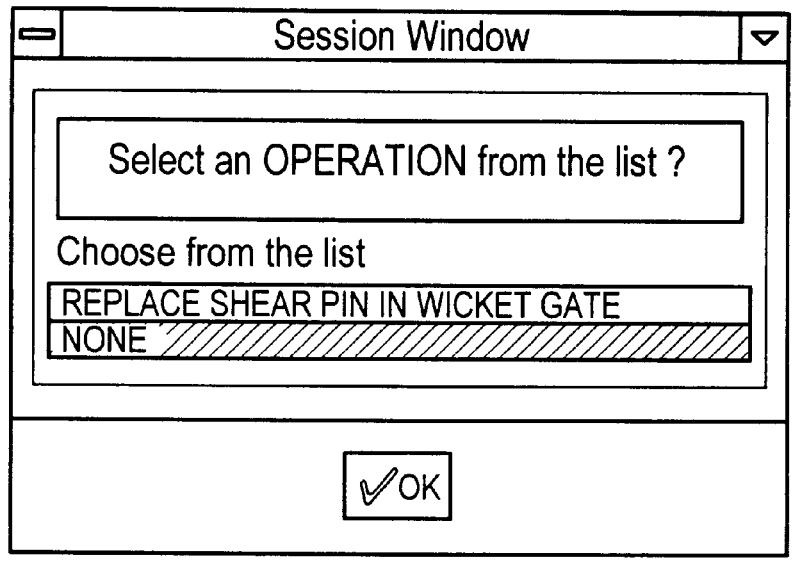
Figure 16:
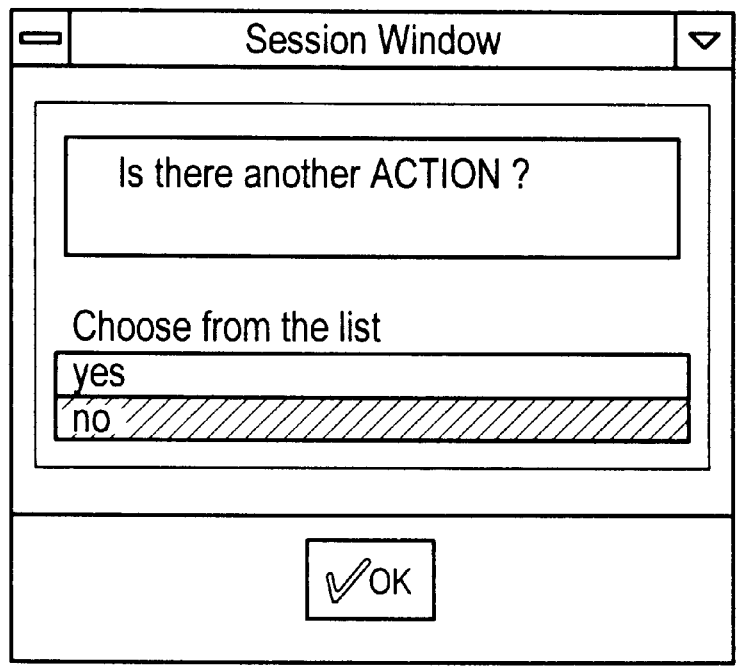

The present invention is an integration system that utilizes a job planning program, adds instructions for accessing a job standards program with its associated database, allows a user to use the logic tree incorporated in the job standards program to determine specific man hour, labor, material and tool requirements, prepare a job plan, transfers this information to the its corresponding fields in the job planning program and uses the job planning program to generate a final job plan and associated work orders. FIG. 1 illustrates the overall system that is accessed from a computer terminal 1. The terminal 1 can access either the job standards program 2 or the job planning program 3, each associated with databases 4, 5, an integration software program 6 allowing switching between the programs and transfer of data, and optionally access to other databases.

A key feature of the invention is the use of the job standards program logic and historical database to allow the program to propose the initial parameters for the job plan, letting the user then accept reject or modify the preliminary parameters. For this invention, "standard" means one or more operations typically required to complete a specific task, including one or more of the hours, craft, duration, materials and tools required to complete a task which are determined by the software program after user queries are answered. For example, from the database and answers to user queries, the job standards program may propose using a three man crew of select crafts to perform the work. The user may change the crew size or craft designation, because of specific conditions that may exist, with the program then updating the proposal to reflect differences, for example in duration (i.e. if a crew size of only two in the craft rather than three are available).

Using the job standards program forces the user to follow predetermined logic to develop job plans using methods based work standards during plan preparation, and thus, improves the accuracy of the manpower and resource allocations that must be made.

For this description, the term "software program" may mean either a stand alone program or a portion of a larger software program that performs the defined task. That is, the job standards program may be a component of a larger software program that performs other functions. Thus, all three programs discussed herein may be components of a single software package, which may be the preferred method for practicing the invention. Of course, other combinations are possible, as the integration software can be integral with either the job standards program or the job planning program, as well as being an independent program. Similarly, these programs need not be all resident on a single computer and can be saved on different computers accessible via intra-net, Internet, modem communication, etc.

In operation, the job planning software is modified to include a software switch that is incorporated on the job plan instructions main menu as a button.

Figure 2:
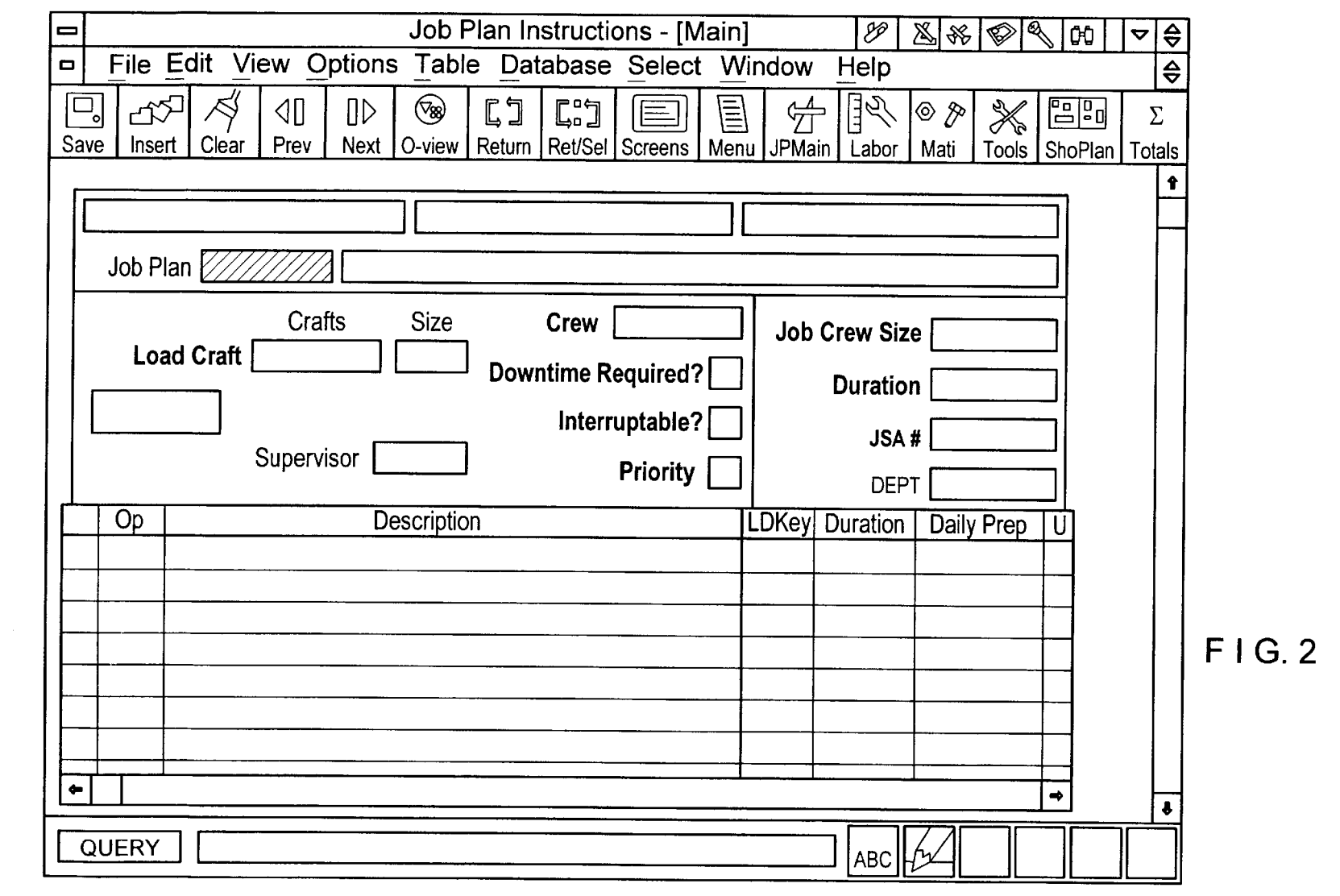

FIG. 2 is illustration of a job plan instruction screen 8 that has a button 9 that can be activated by a user. A job plan number 10 is the link between the job planning program 3 and the job standards program 2. The job plan number will be used to update the job planning tables in the job planning program.

When the button 9 is activated, the job standards logic tree will be executed to generate the job plan parameters. Once the job standards program is initiated, the job standards program searches for the job plan in the job planning program, and if available, will retrieve data from the job plan tables by job plan number.

Both of the programs have access to databases 4, 5, 7 that contain tables of information. For example, one table may contain a list of all crafts, another may contain a list of all equipment in a facility, another the number of persons available in each craft, etc. Some of these lists act as drop down menus for filling out various fields in the job plan screen, job standards screen, etc. If data was entered in the job plan fields before switch activation, then these would be transferred to the job standards program to set the initial user defined parameter.

For example, the description, operation or operation duration, if entered in the appropriate job plan fields, are retrieved and displayed in the job standards program window. If no job plan operations are found using the job plan number, then a series of questions are presented to create a new job plan specification using the logic of the job standards software program.

The job standards program, as stated above, poses questions to the user to develop the job standard. This is done by breaking down a plan into operations, and each operation broken down into various suboperations, A new file is opened for each suboperation and a title given and each step necessary to perform the suboperation is identified. Then the suboperations for each operation are grouped together, and the operations organized to complete the plan.

Each step is identified and a time value assigned, as well as a frequency. For example, if one operation were to rotate tires, one step would be to remove a tire, the frequency being four for removing all four tires.

An operation is a group of suboperations, some of which may have been created previously, combined with others that are newly created. Similarly, an existing operation can be modified to create a new operation by adding, deleting or modifying the suboperations.

Once the operations and suboperations are defined, a multi-activity analysis is performed which provide the manhours and craft type requirements as well as other useful information, such as the control member, i.e., the worker with the most elapsed and wait time. Elapsed time is the amount of time assigned to that worker to perform the specified task and wait time is the amount of time spent waiting for other workers to complete their assigned tasks.

Allowances, for complete job planning, should include travel time, a schedule factor and daily preparation time. These will be discussed in more detail below.

In addition to labor requirements, provision is made for assigning parts needed for specific operations/suboperations such as bolts, nuts, gaskets, etc., so that material requirements are identified. Tools needed can also be identified, though this may be limited to special tools beyond those allocated to a particular craftsman. For example, if a special lift, puller or other tool must be used to perform the task, its identification should be incorporated in the operation/suboperation description.

As discussed above, the job standards program will first attempt to access information concerning the job plan from the job planning program. These may include the following specific fields as shown in Tables 1–4.

TABLE 1

| Name | Size | Remarks |
|---|---|---|
| JOBPLAN | | |
| JPNUM | 10 | Unique identifier for Job Plan |
| DESCRIPTION | 200 | Job Plan description |
| JPDURATION | 8 | Job duration in hours:min |
| LABORCODE | 8 | Lead Craft |
| JP2 | 4 | Support Craft #1 size |
| JP3 | 4 | Support Craft #2 size |
| JP4 | 4 | Support Craft #3 size |

TABLE 1-continued

|  | Name | Size | Remarks |
|---|---|---|---|
|  | JP5 | 4 | Job Crew Size |
|  | JP6 | 20 | Craft #1 |
|  | JP7 | 20 | Craft #2 |
|  | JP8 | 20 | Craft #3 |
| JOB OPERATION |  |  |  |
|  | JPNUM | 10 | Job Plan number |
|  | JPOPERATION | 4 | Job Plan Operation number |
|  | DESCRIPTION | 200 | Job Plan description |
|  | OPDURATION | 8 | Operation duration in hours:min |
|  | JO1 | 4 | Operation reference # in AutoMOST |
|  | JO2 | 8 | Useful block of time in hours:mins |
|  | JO3 | 8 | Daily Prep in hours:mins |
|  | JO4 | 8 | Applied Schedule Factor |

TABLE 2

| JOBLABOR |  |  |  |
|---|---|---|---|
|  | JPNUM | 10 | Job Plan number |
|  | JPOPERATION | 4 | Job Plan Operation number |
|  | LABORCODE | 8 | ID number for Craft |
|  | CRAFTQTY | 4 | Craft Quantity for an Operation |
|  | LABORHRS | 8 | Labor hours for this craft |

TABLE 3

| JOBMATERIAL |  |  |  |
|---|---|---|---|
|  | JPNUM | 10 | Job Plan number |
|  | JPOPERATION | 4 | Job Plan Operation number |
|  | PARTNUM | 8 | Part Number referring to Inventory |
|  | PARTQTY | 15 | Quantity of part required for op |
|  | PARTLOCATION | 20 | Location of part inventory |

TABLE 4

| JOBTOOL |  |  |  |
|---|---|---|---|
|  | JPNUM | 10 | Job Plan number |
|  | JPOPERATION | 4 | Job Operation number |
|  | TOOLNUM | 8 | Unique ID for a tool |
|  | TOOLQTY | 4 | Quantity of tool for operation |
|  | TOOLHRS | 8 | Hours:mins tool is used |
|  | JT4 | 20 | Location |

For ease in illustration, the invention will be described in relation to an example where no job plan operations are found. In such a case, the user will use the job standards program to create a job plan, thereby utilizing standards to build the job plan.

The job standards program is accessed using the button as described previously. The job standards program will automatically generate an operation number and initiate a series of questions, which will generate each operation description with the associated time, labor, tools and materials. (Various questions are illustrated in FIGS. 6–18) For example, the questions can be whether the job requires a site inspection, what is the name of the equipment being worked on, what qualifier terms can apply (i.e., "pump", qualifier, "first sump") what is the action required, ("repair/replace") what specific part is involved ("impeller"), what is the frequency, is there job preparation time, is there another action required, is a test required, do you wish to change the lead craft designation?

Of course, other questions are possible such as identifying special tools required, safety steps required, such as equipment lock out which may impact setup time, etc. Typically, a database for a facility will have the specific equipment predefined so that drop down lists are available. Once a piece of equipment is selected, the question can be whether you wish to select an operation/suboperation for that equipment that was previously developed. That is, the operation for replacing the impeller could have been developed before, and if so, could be selected also from a drop down list, to utilize the existing standard specification. The job crew size, manhours/duration, etc., are calculated automatically after the job operation is defined. At that point, the user can override the specified parameters and request an updated calculation to see how the changes affect the job plan.

Once the operations/suboperations standards are created, including the parts needed, duration, craft, etc., these are available for use in creating new operations and new job plans. For example, an operation can involve disconnecting the piping to the first sump pump. This preliminary operation is stored and can be called up for use in many different repair operations.

The Job Planning Software Program

Figure 5:
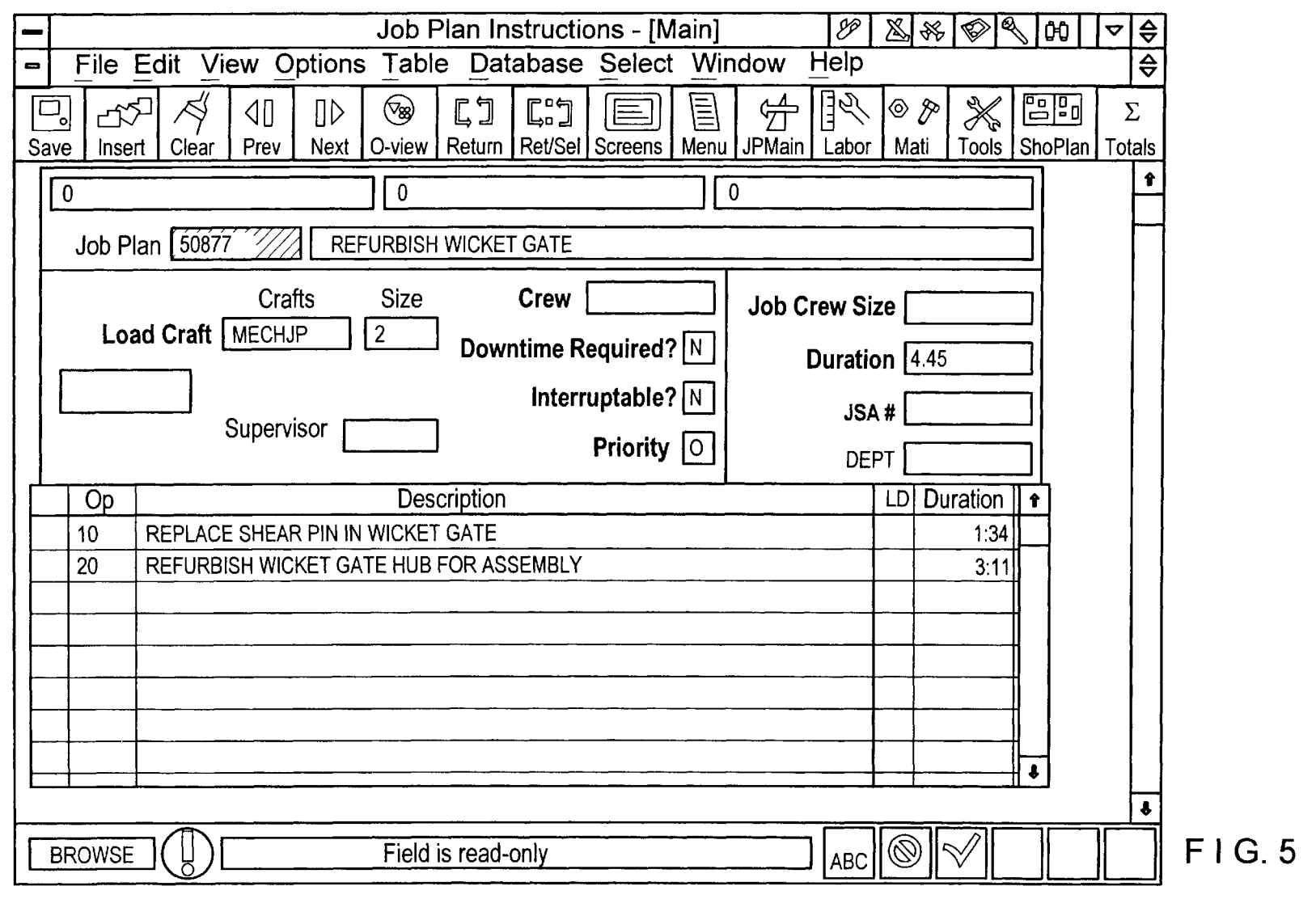

After each operation is identified and completed in the job standards program, the user is asked if the planning is complete. When the user answers yes, the details from the job standards program can be used to fill in the corresponding fields in the job planning screen. (See FIG. 5) Alternatively, the details are transferred as a complete job plan. Thus, a job plan is created using the methods based job standards program and the details loaded into the job planning software, the user obtaining a completed job plan with the job standards program generated information.

A work order is then generated. At this point, the user can apply various adjustments, for example, to change the estimated job duration to allow for actual conditions such as a schedule factor to compensate for job site conditions which would delay completion of the work. For example, based on past performance over a defined period, such as over the past 4 to 14 weeks, an average of the difference between actual hours and estimated hours is taken and applied. For example, if actual work averages 10% more time than estimated, the prior over a six week period, this can be applied to the work order. This adjustment can also take into consideration differences in performance by craft, by type of equipment, etc. depending on the to preferences of the user. Generally, after the work is completed, the work order is returned and the actual time, materials and tools used are added to the database which allows for determination of the schedule factor, as well as provide a measure of overall performance.

This schedule factor is calculated automatically and the user can be asked whether to apply the schedule factor to the duration hours and to the labor man-hours, by activating a work order update button on the job planning display or work order operations screen. Once activated, the work order operation and labor tables in the job planning program will be updated.

Travel time is another adjustment which may be made on the work order operations screen. This requires that the location field on the work order be filled in so that the program can reference a table containing travel times in the facility, for example, it may take 15 minutes to travel from a workshop to the first sump pump.

Daily preparation is another optional adjustment. This is the preparation time to start a job each day, such as time to collect tools and receive instructions from the foreman.

Various examples showing preparation of job plans and work orders according to the present invention follow.

Job Preparation Example 1

The user accesses a job planning screen in the job planning software, to prepare a job plan for replacing a broken shear pin. The user enters a job planning number and clicks onto the button to switch to the job standards program. The user then defines the first operation as follows:

| | Description: REPLACE BROKEN SHEAR PIN | | |
|---|---|---|---|
| | | Duration | Daily Prep |
| 10 | REPLACE BROKEN SHEAR PIN IN WICKET GATE | 0.81 | 0.00 |
| | 1. Remove keeper plate | | |
| | 2. Setup hydraulic jack | | |
| | 3. Install jacking rod | | |
| | 4. Jack out shear pin | | |
| | 5. Hand ream shear pin hole | | |
| | 6. Install shear pin | | |
| | 7. Install keeper plate | | |
| | 8. Replace detector piping | | |
| 20 | REPLACE SHEAR PIN | 1.62 | 0.11 |
| | 1. Remove keeper plate | | |
| | 2. Setup hydraulic jack | | |
| | 3. Install jacking rod | | |
| | 4. Jack out shear pin | | |
| | 5. Hand ream shear pin hole | | |
| | 6. Install shear pin | | |
| | 7. Install keeper plate | | |

CALCULATIONS
Formula multi-activity analysis (MAA)Clock Time+(Sum of MAA Basic PrepTime/Crew Size)

Note: Dividing the job prep time by the crew size is simply a man-hour to duration conversion.

For Op 10 0.81 hrs+(0.00 hrs)/2 man crew=0.81 hrs

Note: The MAA for replacing a broken shear pin would not be a task performed by itself so there would not be any job prep elements assigned to the analysis.

For Op 20 1.04 hrs+(0.73 hrs+0.12 hrs+0.52 hrs)/2 man crew= 1.62 hrs

Note: The shear pins in the wicket gates on either side of the gate with the broken pin are replaced as a rule of caution. The time to replace one shear pin is 0.52 hours. Therefore, the duration for the site work to replace the other two pins is 2 pins×0.52 hours/pin=1.04 hours. The logic during job plan development asks for the frequency to be applied.

After this information is developed, the user then can return to the job planning screen where either the fields are filled in from this data or saved as a complete job plan in the job planning program. The user then prepares to produce a work order as follows.

WORK ORDER CALCULATION DEFINITIONS

A. Duration after Schedule Factor—The operation duration time multiplied by the schedule factor.
   Operation duration time*schedule factor B. Daily Prep after Schedule Factor—The daily prep duration time multiplied by the schedule factor.
   Daily prep duration time*schedule factor C. Number of Days
   The number of days are required to properly apply the daily prep at the operation level and the total travel time for the job. This requires two separate calculations as shown below.

C1. For Applying Daily Prep
   The duration of the operation divided by the available hours in a day. The available hours in a day are adjusted to omit the round trip travel and the daily prep.

Sum of the operation duration times/(8.0−(2*one-way travel time)−B)

C2. For Applying Total Travel Time
   The total duration of the job plan (sum of all operations) divided by the available hours in a day. The available hours in a day are adjusted to omit the round trip travel and the sum of the daily preps for each operation.

Sum of the operation duration times/(8.0−(2*one-way travel time)−the sum of B for all operations)

D. New Duration
   The new duration is the operation duration time after application of the schedule factor plus the daily prep after application of the schedule factor multiplied by the number of days.

A+(B*C1)

E. Travel Time
   The number of days multiplied by the round trip travel time.

C2*(2*travel time)

Note: The one-way travel time in C & E above is multiplied by 2 to account for a round trip travel time.

EXAMPLE WORK ORDER

Description: REPLACE BROKEN SHEAR PIN
Assume: Schedule Factor = 2.0    One-way travel = 0.25 hours

|  |  |  | Duration | Daily Prep |
|---|---|---|---|---|
| 10 | REPLACE BROKEN SHEAR PIN IN WICKET GATE | | 1.62 | 0.00 |
|  | 1. | Remove keeper plate | | |
|  | 2. | Setup hydraulic jack | | |
|  | 3. | Install jacking rod | | |
|  | 4. | Jack out shear pin | | |
|  | 5. | Hand ream shear pin hole | | |
|  | 6. | Install shear pin | | |
|  | 7. | Install keeper plate | | |
|  | 8. | Replace detector piping | | |
| 20 | REPLACE SHEAR PIN | | 3.46 | 0.22 |
|  | 1. | Remove keeper plate | | |
|  | 2. | Setup hydraulic jack | | |
|  | 3. | Install jacking rod | | |
|  | 4. | Jack out shear pin | | |
|  | 5. | Hand ream shear pin hole | | |
|  | 6. | Install shear pin | | |
|  | 7. | Install keeper plate | | |
| 999 | TRAVEL | | 0.50 | |
|  | Total | | 5.58 hrs | |

LABOR DISTRIBUTION

| OP | CRAFT CODE | QTY | HOURS | MANHOURS |
|---|---|---|---|---|
| 10 | MECHJP | 2 | 1.62 | 3.24 |
| 20 | MECHJP | 2 | 3.46 | 6.92 |
| 999 | MECHJP | 2 | 0.50 | 1.00 |
| | TOTALS | | 5.58 | 11.16 |

WORK ORDER CALCULATIONS

| Step | Op | Description | Calculation |
|---|---|---|---|
| 1. | 10 | Duration after Schedule Factor | 0.81 hrs * 2.0 = 1.62 hrs |
|  |  | Daily Prep after Schedule Factor | 0.00 hrs * 2.0 = 0.00 hrs |
|  |  | Total | 1.62 hrs |
| 2. | 20 | Duration after Schedule Factor | 1.62 hrs * 2.0 = 3.24 hrs |
|  |  | Daily Prep after Schedule Factor | 0.11 hrs * 2.0 = 0.22 hrs |
|  |  | Total | 3.46 hrs |
| 3. |  | For application of job prep | |
|  | 10 | Number of days | 1.62 hrs/8.0 hrs − (2 * 0.25 hrs) − 0.00 hrs |
|  |  |  | = 1.62 hrs/7.5 hrs |
|  |  |  | = 0.22 |
|  |  |  | = 1.0 day |
|  | 20 | Number of days | 3.46 hrs/8.0 hrs − (2 * 0.25 hrs) − 0.22 hrs |
|  |  |  | = 3.46 hrs/7.28 hrs |
|  |  |  | = 0.48 |
|  |  |  | = 1.0 day |
|  |  | For application of total travel time | |
|  |  |  | (1.62 hrs + 3.46 hrs)/(8.0 hrs − (2 * 0.25 hrs) − (0.00 + 0.22) hrs |
|  |  |  | = 5.08 hrs/7.28 hrs |
|  |  |  | = 0.70 |
|  |  |  | = 1.0 day |
| 4. | 10 | New Duration | 1.62 hrs + (1.0 day * 0.00 hrs) = 1.62 hrs |
|  | 20 | New Duration | 3.24 hrs + (1.0 day * 0.22 hrs) = 3.46 hrs |
| 5. | 999 | Travel Time | 1.0 day * (2.0 * 0.25 hrs) = 0.50 hrs |

Note: The bold numbers are the ones used in the work order on the previous page.

Job Preparation Example 2

The user accesses a job planning screen in the job planning software, to prepare a job plan for disassembly of a servo motor and piping. The user enters a job plan number and clicks the button for switching to the job standards program. The user then uses the logic and queries in the job standards program to identify nine operations required to complete the activity, each operation having been defined previously and being assembled to produce a new job plan. These are identified as follows.

Description: DISASSEMBLE SERVO MOTOR AND PIPING

|    |                              | Duration | Daily Prep |
|----|------------------------------|----------|------------|
| 10 | DRAIN OIL IN TO SUMP         | 1.61     | 0.12       |
| 20 | REMOVE GREASE LINES          | 0.29     | 0.12       |
| 30 | DISCONNECT SERVO LINK ARM    | 2.37     | 0.20       |
| 40 | REMOVE SERVO PIPING          | 1.78     | 0.00       |
| 50 | DISCONNECT RESTORING CABLE   | 0.28     | 0.00       |
| 60 | RIG CRANE                    | 0.75     | 0.00       |
| 70 | ATTACH RIGGING TO SERVO MOTOR| 0.74     | 0.00       |
| 80 | REMOVE DOWEL PINS AND BOLTS  | 0.51     | 0.12       |
| 90 | LIFT AND MOVE SERVO TO ASSEMBLY | 0.86  | 0.00       |

CALCULATIONS

Formula:

MAA Clock Time + (Sum of MAA Basic Prep Time)/Crew Size

| For OP10 | 1.53 hrs + (0.16 hrs)/2 man crew = 1.61 hrs |
| For OP20 | 0.25 hrs + (0.08 hrs)/2 man crew = 0.29 hrs |
| For OP30 | 2.24 hrs + (0.40 hrs)/3 man crew = 2.37 hrs |
| For OP40 | 1.78 hrs + (0.00 hrs)/4 man crew = 1.78 hrs |
| For OP50 | 0.28 hrs + (0.00 hrs)/2 man crew = 0.28 hrs |
| For OP60 | 0.75 hrs + (0.00 hrs)/3 man crew = 0.75 hrs |
| For OP70 | 0.69 hrs + (0.20 hrs)/4 man crew = 0.74 hrs |
| For OP80 | 0.47 hrs + (0.08 hrs)/2 man crew = 0.51 hrs |
| For OP90 | 0.86 hrs + (0.00 hrs)/4 man crew = 0.86 hrs |

After this information is developed, the user then can return to the job planning screen where either the fields are filled in from this data or saved as a complete job plan in the job planning program. The user then prepares to produce a work order as follows.

EXAMPLE WORK ORDER

Description: DISASSEMBLE SERVO MOTOR AND PIPING
Assume: Schedule Factor 2.0    One-way Travel = 0.4 hrs

|     |                               | Duration | Daily Prep |
|-----|-------------------------------|----------|------------|
| 10  | DRAIN OIL INTO SUMP           | 3.46     | 0.24       |
| 20  | REMOVE GREASE LINES           | 0.82     | 0.24       |
| 30  | DISCONNECT SERVO LINK ARM     | 5.14     | 0.40       |
| 40  | REMOVE SERVO PIPING           | 3.56     | 0.00       |
| 50  | DISCONNECT RESTORING CABLE    | 0.56     | 0.00       |
| 60  | RIG CRANE                     | 1.50     | 0.00       |
| 70  | ATTACH RIGGING TO SERVO MOTOR | 1.48     | 0.00       |
| 80  | REMOVE DOWEL PINS AND BOLTS   | 1.26     | 0.24       |
| 90  | LIFT AND MOVE SERVO TO ASSEMBLY | 1.72   | 0.00       |
| 999 | TRAVEL                        | 3.20     |            |

WORK ORDER CALCULATIONS

| Step | Op | Description | Calculation |
|------|----|----|----|
| 1. | 10 | Duration after Schedule Factor | 1.61 hrs * 2.0 = 3.22 hrs |
|    |    | Daily Prep after Schedule Factor | 0.12 hrs * 2.0 = 0.24 hrs |
|    |    | Total | 3.46 hrs |
|    | 20 | Duration after Schedule Factor | 0.29 hrs * 2.0 = 0.58 hrs |
|    |    | Daily Prep after Schedule Factor | 0.12 hrs * 2.0 = 0.24 hrs |
|    |    | Total | 0.82 hrs |
|    | 30 | Duration after Schedule Factor | 2.37 hrs * 2.0 = 4.74 hrs |
|    |    | Daily Prep after Schedule Factor | 0.20 hrs * 2.0 = 0.40 hrs |
|    |    | Total | 5.14 hrs |
|    | 40 | Duration after Schedule Factor | 1.78 hrs * 2.0 = 3.56 hrs |
|    |    | Daily Prep after Schedule Factor | 0.00 hrs * 2.0 = 0.00 hrs |
|    |    | Total | 3.56 hrs |
|    | 50 | Duration after Schedule Factor | 0.28 hrs * 2.0 = 0.56 hrs |
|    |    | Daily Prep after Schedule Factor | 0.00 hrs * 2.0 = 0.00 hrs |
|    |    | Total | 0.56 hrs |
|    | 60 | Duration after Schedule Factor | 0.75 hrs * 2.0 = 1.50 hrs |
|    |    | Daily Prep after Schedule Factor | 0.00 hrs * 2.0 = 0.00 hrs |
|    |    | Total | 1.50 hrs |
|    | 70 | Duration after Schedule Factor | 0.74 hrs * 2.0 = 1.48 hrs |
|    |    | Daily Prep after Schedule Factor | 0.00 hrs * 2.0 = 0.00 hrs |
|    |    | Total | 1.48 hrs |

-continued

| | | | |
|---|---|---|---|
| | 80 | Duration after Schedule Factor | 0.51 hrs * 2.0 = 1.02 hrs |
| | | Daily Prep after Schedule Factor | 0.12 hrs * 2.0 = 0.24 hrs |
| | | Total | 1.26 hrs |
| | 90 | Duration after Schedule Factor | 0.86 hrs * 2.0 = 1.72 hrs |
| | | Daily Prep after Schedule Factor | 0.00 hrs * 2.0 = 0.00 hrs |
| | | Total | 1.72 hrs |

2. For application of daily prep

| | | |
|---|---|---|
| 10 | Number of Days | 3.22 hrs/8.0 hrs − (2 * 0.4 hrs) − 0.24 hrs |
| | | = 3.22 hrs/6.96 hrs |
| | | = 0.462 |
| | | = 1.0 day |
| 20 | Number of Days | 0.58 hrs/8.0 hrs − (2 * 0.4 hrs) − 0.24 hrs |
| | | = 0.58 hrs/6.96 hrs |
| | | = 0.08 |
| | | = 1.0 day |
| 30 | Number of Days | 4.74 hrs/8.0 hrs − (2 * 0.4 hrs) − 0.40 hrs |
| | | = 4.74 hrs/6.80 hrs |
| | | = 0.69 |
| | | = 1.0 day |
| 40 | Number of Days | 3.56 hrs/8.0 hrs − (2 * 0.4 hrs) − 0.00 hrs |
| | | = 3.56 hrs/7.20 hrs |
| | | = 0.49 |
| | | = 1.0 day |
| 50 | Number of Days | 0.56 hrs/8.0 hrs − (2 * 0.4 hrs) − 0.00 hrs |
| | | = 0.56 hrs/7.20 hrs |
| | | = 0.08 |
| | | = 1.0 day |
| 60 | Number of Days | 1.50 hrs/8.0 hrs − (2 * 0.4 hrs) − 0.00 hrs |
| | | = 1.50 hrs/7.20 hrs |
| | | = 0.21 |
| | | = 1.0 day |
| 70 | Number of Days | 1.48 hrs/8.0 hrs − (2 * 0.4 hrs) − 0.00 hrs |
| | | = 1.48hrs/7.20 hrs |
| | | = 0.21 |
| | | = 1.0 day |
| 80 | Number of Days | 1.02 hrs/8.0 hrs − (2 * 0.4 hrs) − 0.24 hrs |
| | | = 1.02 hrs/6.96 hrs |
| | | = 0.146 |
| | | = 1.0 day |
| 90 | Number of Days | 1.72 hrs/8.0 hrs − (2 * 0.4 hrs) − 0.00 hrs |
| | | = 1.72 hrs/7.20 hrs |
| | | = 0.24 |
| | | = 1.0 day |

3. For application of total travel time

| | | |
|---|---|---|
| Sum of all operations | = | (3.22 + 0.58 + 4.74 + 3.56 + 0.56 + 1.50 + 1.48 + 1.02 + 1.72) = 18.4 hrs |
| Sum of all daily prep | = | (0.24 + 0.24 + 0.40 + 0.24) = 1.12 hrs |
| Number of Days | = | 18.4 hrs/8.0 − (2 * 0.4 hrs) − 1.12 hrs |
| | = | 18.4 hrs/6.08 hrs |
| | = | 3.02 |
| | = | 4.0 days |

4. New Duration

| | |
|---|---|
| For Op10 | 3.22 hrs + (1.0 day * 0.24 hrs) = 3.46 hrs |
| For Op20 | 0.58 hrs + (1.0 day * 0.24 hrs) = 0.82 hrs |
| For Op30 | 4.74 hrs + (1.0 day * 0.40 hrs) = 5.14 hrs |
| For Op40 | 3.56 hrs + (1.0 day * 0.00 hrs) = 3.56 hrs |
| For Op50 | 0.56 hrs + (1.0 day * 0.00 hrs) = 0.56 hrs |
| For Op60 | 1.50 hrs + (1.0 day * 0.00 hrs) = 1.50 hrs |
| For Op70 | 1.48 hrs + (1.0 day * 0.00 hrs) = 1.48 hrs |
| For Op80 | 1.02 hrs + (1.0 day * 0.24 hrs) = 1.26 hrs |
| For Op90 | 1.72 hrs + (1.0 day * 0.00 hrs) = 1.72 hrs |

5. Travel Time

| | |
|---|---|
| For Op999 | Travel Time 4.0 days * (2 * 0.4 hrs) = 3.2 hrs |

As described earlier, the job standards program will use the following steps to create a Job Plan:

1) Automatically generate an Operation Number for each operate step in the Job Plan. The first number will be 10. Subsequent operation numbers will be sequenced in increments of ten.
2) Select the Operation Description.
   This will be done by answering all questions required by the logic tree for creating Job Plans. The responses to these questions will generate the Operation Description with the associated time and labor.
3) If there are Job Preparation time associated with the Multi Activity Analysis, MAA, the times will be displayed in a Job Preparation window for each operation step. (See FIG. 3)

The user will be asked whether to include preparation times, YES or NO. If Yes, then the time for all preparation except DAILY will be added to the operation duration. The Daily Prep will be carried over to the Job Plan as a separate entity. If No, then no preparation time will be added to the operation duration. The Daily Preparation will not be carried over to the Job Plan. After the Job Plan is stored in the job planning software database, the user can input only daily preparation in the Work Order Operations screen. The manually entered daily preparation must be reasonable and entered before the data is updated.

4) Do you want to add another Operation?
   If Yes, then the user returns to Step 1 to continue using the job standards logic tree to generated additional operation descriptions.
5) Do you want to save the Job Plan?
   If Yes, then a display of various crafts with crew size is presented, with a request to confirm or modify these. For example, the lead craft may be changed, with a request to modify the lead craft crew size. If the craft or crew size entered is other than what is displayed, the message "You are over-ridding values recommended by the job standards program, Do you want to continue?" will be displayed. If No, then the job standard program selections are reentered. If yes, then the user selected lead craft is used.

If any tools and materials are associated with the selected operations, the planner will be asked to include all tools and materials. These can be supplied by drop down menu, or by part or tool number. If No, then the tools and materials are not added. If yes, then the job standards selected tools and materials will be added into the job plan. Once complete, the user exits from the job standards program and returns to the job planning program by clicking on a button, where the fields in the job plan are populated with the information generated in the job standards program, or the completed job plan is transferred in its entirety.

To revise a Job Plan, the user has three actions that can be performed on an operation: add, delete, and modify. The user can add a new operation to an existing job plan by using the job standards program or by using the job planning program. The user can delete a complete operation in the Job Plan by using the job standards program, or can modify an operation in the Job Plan by using either program. To use the job standards program, the following steps may be used:
1) Display Job Plan in Job Plan Operation window.
2) Ask question: MODIFY, INSERT, or DONE
   IF, MODIFY
      THEN>Go to Step 3
   IF, INSERT
      THEN>Go to Step 8
   IF, DONE
      THEN>Go to Step 12
3) Select the Operation Number that the planner will modify. The Operation Number is a line entry in the Job Plan Operation screen that is associated with an operation description.
4) Ask: What is the ACTION for this operation?
   >Disassemble, Modification, Assemble
   >Site Inspection
   >Test
   Disassemble, Modification, Assemble contains the data driven logic, Site Inspection and Test are logic driven and select only specific MAA elements.
   The Operation Description will be selected by answering all questions required by the logic tree for revising Job Plans. The responses to the logic tree questions will generate the Operation Description.
5) Follow steps for creating a Job Plan for qualifying the MAA selected by the job standards program.
6) If a Long Description Key exists for this operation. The planner will be asked:
   Do you want to keep the LDKey for this operation?
   IF, No
      THEN>Delete LDKey when Job Plan is saved.
   IF, Yes
      THEN>Retain the current LDKey.
7) Go to Step 2.
8) Select an Operation Number.
9) Follow logic in Create a Job Plan in the job standards program.
10) Go to Step 2.
11) Do you want to save the Job Plan?
    IF, Yes
       THEN>Display up to 4 Crafts with crew size (See FIG. 4)
       >Request to modify Lead Craft.
       >Request to modify Lead Craft Crew size if Lead Craft is changed.
       >If the craft or crew size entered is other than what is displayed, the message "You are over-ridding values recommended by the job standards program, Do you want to continue?" will be displayed.
          If, No
             THEN>Go to Modify Lead Craft
          If, Yes
             THEN>Continue
       >If any Tools and Materials are associated with the selected operations, the planner will be asked to include all tools and materials.
          If, No
             THEN>Do not add Tools and Materials
          If, Yes
             THEN>Add Tools and Materials to the Job Plan
       >Insert data into job plan tables
    IF, No
    THEN>Control is returned to the welcome window.
       The user has the option to revise a Job Plan or EXIT.
12) The revision of a Job Plan is finished, control is returned to the job planning software.

Utilizing the present invention, optimized job plans and work orders can be generated that accurately identify manpower, material and tool requirement. With optimized planning, delays are avoided and equipment downtime minimized. For routine, emergency and preventive maintenance, specific materials and tools can be rapidly identified and made available to complete operations in a timely manner. Further, sufficient flexibility is provided in standards development to accommodate the various day to day changes that occur, allowing changes to be incorporated into the job plan so that overall planning is not disrupted. By utilizing job standards logic, the user has an effective tool for avoiding errors in job planning.

While preferred embodiments of the present invention have been shown and described, it will be understood by those skilled in the art that various changes or modifications can be made without varying from the scope of the invention.

I claim:
1. A system for maintenance resource management comprising:
   a user accessible computer terminal;
   a first software program for producing job standards based on predetermined user queries and information con- tained in a database, the first software program being accessible by the computer terminal;

a second software program for producing a job plan based on information supplied by a user through the computer terminal, the second software program being accessible by the computer terminal; and, an integration software program having a switch responsive to a user command entered through the computer terminal and initiated through either the first or second software program to switch the user to the second or first software program respectively, and having means for transferring data from one software program to the other software program for filling predefined fields in one software program from the other software program such that a user generates a job standard in the first software program and transfers at least portions of the developed job standard into a job plan that is saved in the second software program.

2. The system of claim 1 wherein the second software program has means to produce a work order based on the job plan.

3. The system of claim 1 wherein the first software program has access to a database containing data tables selected from the group consisting of equipment tables, labor tables, manhour tables, operation tables, material tables, tool tables and combinations thereof.

4. A method for preparing a job plan for a maintenance operation comprising:

providing a first software program for producing job standards based on user queries and information contained in a database;

providing a second software program for producing a job plan based on information supplied by a user;

providing an integration software program having a switch responsive to a user command to switch the user from either the first or second program to the second or first program respectively and transfer means for transferring data between the first and second programs;

accessing the second software program to initiate job plan creation, actuating the integration software program switch to switch to the first software program, using the first software program to develop a preliminary job plan and activating the switch and transfer means to transfer at least selected portions of the preliminary job to the second software program thereby creating the job plan in the second software program.

5. The method of claim 4 further comprising using the second software program to generate a work order.

6. The method of claim 4 further comprising adjusting the job plan using a schedule factor.

7. The method of claim 4 further comprising adjusting the job plan using a schedule factor.

8. The method of claim 4 further comprising adjusting the job plan using estimated daily preparation time.

9. The method of claim 4 further comprising using the first software to program to identify each operation step to be performed to complete the maintenance operation, and to determine the labor required, operation duration, material required and tools required for each operation step.

10. The method of claim 9 further comprising reviewing the first software program operation steps and accepting, rejecting or modifying each operation step.

11. The method of claim 9 further comprising saving each operation step in the database.

12. The method of claim 11 wherein the first software program has access to the saved operation steps when preparing a subsequent job plan.

13. The method of claim 4 wherein a complete job plan is transferred to the second software program.

14. The system of claim 1 further comprising a second database accessible by either the first or second software program, the second database containing saved operation data.

* * * * *